J. JOSEPH.
ROTARY CHURN.

No. 185,754. Patented Dec. 26, 1876.

Witnesses:
Floyd Norris
W. E. Chaffee

Inventor:
Joseph Joseph
by Johnson and Johnson
Attys.

THE GRAPHIC CO. N.Y.

UNITED STATES PATENT OFFICE.

JOSEPH JOSEPH, OF SPARTA, TENNESSEE.

IMPROVEMENT IN ROTARY CHURNS.

Specification forming part of Letters Patent No. 185,754, dated December 26, 1876; application filed October 25, 1876.

*To all whom it may concern:*

Be it known that I, JOSEPH JOSEPH, of Sparta, in the county of White and State of Tennessee, have invented certain new and useful Improvements in Churns, of which the following is a specification:

In my improved churn two interlocking dasher-wheels are arranged to revolve vertically in a yoke-frame, one above the other, to obtain the advantage of having the upper one operate partially within a top air-chamber together and drive the air rapidly from the top of the chamber down into the milk as it is thrown up by the lower dashers, and while the upper dashers drive the milk down with the air. The upper dasher-shaft is the driver, and the yoke-frame is a bent spring-bar fitted in guides, and from which the dashers may be easily removed and replaced by springing out the side bars. The vertical slot, through which the crank-shaft passes at the top, is covered by the side of the yoke-frame to prevent leaking.

The dasher-wheels are arranged centrally in the churn, and the upper one revolves the lower one. As the milk thickens, however, the dasher-wheels run in a partially-formed path, and to avoid this I combine therewith agitators arranged on one or both sides of the dasher-wheels, and revolved separately by by their shafts. I prefer to have the wings of these agitators arranged obliquely to each other so as to throw the milk from the sides of the churn to the center and upon the dasher-wheels.

Figure 1:
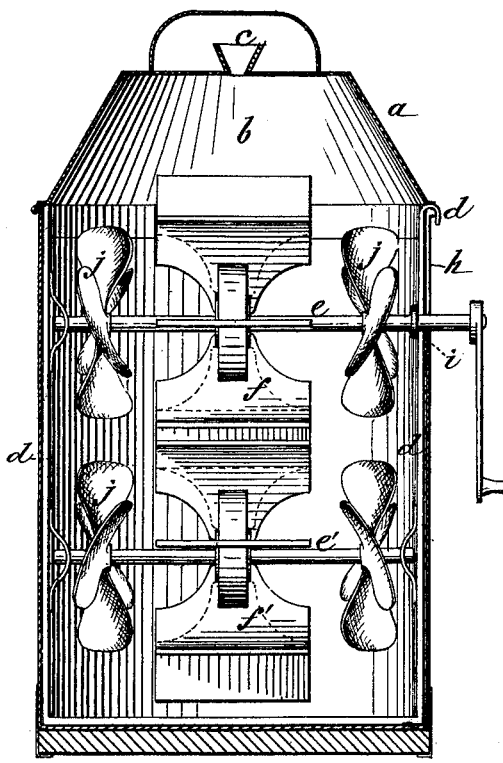
Figure 2:
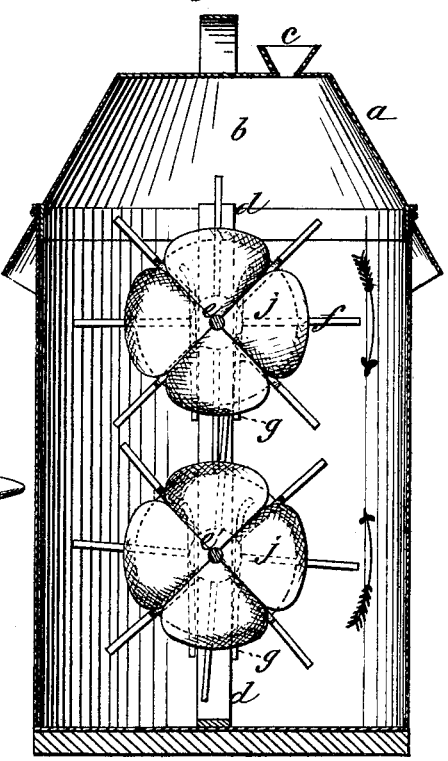
Figure 3:
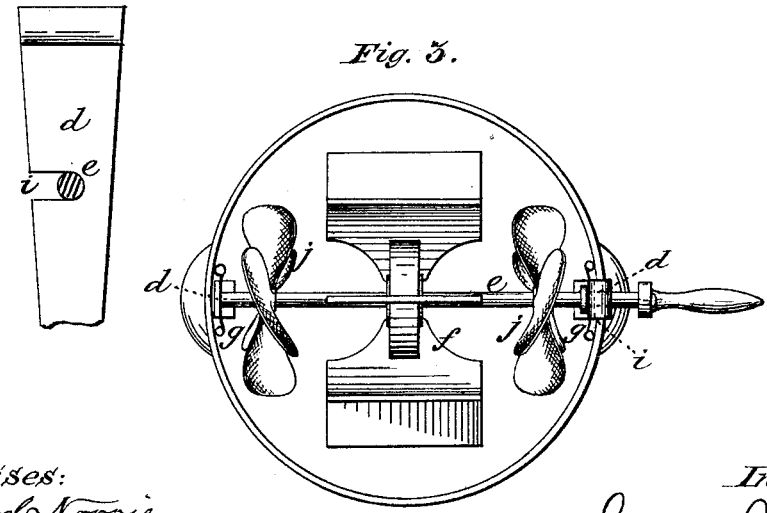

In the accompanying drawings, Figure 1 represents a vertical section of a churn embracing my invention; Fig. 2, a similar section at right angles, and Fig. 3 top view with the cover removed.

The body of the churn I prefer to make of tin and of cylindrical form, re-enforced with a wooden bottom. The cover $a$ is conical, and forms a top air-chamber, $b$, there being one or more openings, $c$, in said cover for the supply of air. A yoke-frame, $d$, supports and carries upon separate horizontal shafts $e$ $e'$ two dasher-wheels, $f f'$, arranged to revolve vertically in the center of the chamber, and to interlock so that the upper dasher-wheel, turning in one direction, will turn the other in the opposite direction, the effect of which will be to throw the milk both up and down. The upper dasher-wheel operates within the top air-chamber, and by a positive force drives the air down into the milk and produces the best effect.

The yoke-frame is a bent spring-bar fitted into guides $g$ $g$ in the walls of the churn, so that it can be removed with the dasher-wheels when desired, the spring of the side bars $d$ $d$ also allowing the dasher-wheel shafts to be removed and replaced at pleasure, so that all can be kept clean. The upper shaft $e$ is operated by a crank and the vertical side slot $h$, through which it passes, is closed by the side bar $d$ to prevent leakage, said side bar being notched at $i$ to form a bearing for the crank end of said shaft.

The position of the upper dasher-wheel in the air-chamber, and its arrangement directly over the lower one, gives great advantage in taking the air from the top and forcing it through the body of the milk. The dasher-wheels are supplemented by agitators $j$, arranged at one or both sides of said wheels, so as to be revolved separately upon their shafts. These agitators have their wings arranged obliquely to each other, the object of which is to throw the milk from the side spaces of the churn inward upon the dasher-wheels, and thus give thorough agitation to the body of the milk, and break up the path in which the dasher-wheels run as the butter is forming. They are comparatively small, and may be arranged on one or both sides, or alternately one on each shaft, on opposite sides of said wheels. A simply revolving blade with an oblique face would answer the purpose in giving aid to the dasher-wheels, if arranged upon their shafts, as described. The dasher-wheels may be of any simple construction, and the butter can be made in from seven to ten minutes, according to the state of the milk. The can or body is provided with handles, and the top opening may have a funnel, through which to pour in the milk and water without removing the cover.

I claim—

1. The horizontal interlocking dasher-wheels, one above the other, within a yoke spring frame, $d$, as arranged in relation to the top air-chamber $b$, within which the upper dasher-wheel operates to force the air down into the milk as it is thrown up by the lower dasher-wheel, as herein specified.

2. The yoke-spring frame $d$ for the dasher-wheel shafts $e$ $e'$, arranged and supported within the wall-guides $g$, and provided with a notched bearing, $i$, for the crank-shaft $e$, in combination with the churn-body, having the vertical side slot $h$ covered by the vertical side $d$ of said yoke-frame, as and for the purpose set forth.

3. The combination, with the intelocking dasher-wheels, arranged to operate as described, of the supplemental side agitators $j$, with oppositely-inclined blade revolved separately by the dasher-wheel shafts, substantially as and for the purpose herein set forth.

In testimony whereof I have affixed my signature in the presence of two witnesses.

JOSEPH JOSEPH.

Witnesses:
 W. J. LITTLE,
 J. M. SMITH.